United States Patent
Ito et al.

(10) Patent No.: US 9,618,717 B2
(45) Date of Patent: Apr. 11, 2017

(54) OPTICAL FIBER UNIT, OPTICAL FIBER BRANCHING METHOD, AND OPTICAL FIBER CABLE

(71) Applicant: FUJIKURA LTD., Tokyo (JP)

(72) Inventors: Naoto Ito, Sakura (JP); Masayuki Ishioka, Sakura (JP); Kouji Tomikawa, Sakura (JP); Ken Osato, Sakura (JP); Masayoshi Yamanaka, Sakura (JP); Naoki Okada, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/915,657

(22) PCT Filed: Oct. 1, 2014

(86) PCT No.: PCT/JP2014/076259
§ 371 (c)(1),
(2) Date: Mar. 1, 2016

(87) PCT Pub. No.: WO2015/053146
PCT Pub. Date: Apr. 16, 2015

(65) Prior Publication Data
US 2016/0223769 A1    Aug. 4, 2016

(30) Foreign Application Priority Data
Oct. 7, 2013    (JP) .................. 2013-210084

(51) Int. Cl.
*G02B 6/44*    (2006.01)
*G02B 6/46*    (2006.01)

(52) U.S. Cl.
CPC ......... *G02B 6/4413* (2013.01); *G02B 6/4403* (2013.01); *G02B 6/4405* (2013.01); *G02B 6/4407* (2013.01); *G02B 6/46* (2013.01)

(58) Field of Classification Search
CPC .. G02B 6/4413; G02B 6/4403; G02B 6/4405; G02B 6/4407; G02B 6/46
See application file for complete search history.

(56) References Cited

U.S. PATENT DOCUMENTS

| 3,602,446 A | * | 8/1971 | Kawashima | ........... B65H 54/00 242/476.7 |
| 5,531,064 A | * | 7/1996 | Sawano | ............... G02B 6/4403 385/112 |

(Continued)

FOREIGN PATENT DOCUMENTS

| JP | 9-178989 A | 7/1997 |
| JP | 2009-251145 A | 10/2009 |

(Continued)

OTHER PUBLICATIONS

International Preliminary Report on Patentability issued from the International Bureau in counterpart International Application No. PCT/JP2014/076259, issued on Apr. 21, 2016.

(Continued)

*Primary Examiner* — Ryan Lepisto
*Assistant Examiner* — Guy Anderson
(74) *Attorney, Agent, or Firm* — Sughrue Mion, PLLC

(57) ABSTRACT

An objective of the disclosure is to improve workability in extracting optical fibers in an optical fiber unit in which a bundle of optical fibers is bundled by bundling members, and to suppress/prevent an increase in transmission loss even when tension is applied to the bundling members. This optical fiber unit includes: a plurality of optical fibers; and at least three bundling members that bundle the optical fibers into a bundle. A first bundling member, among the plurality of bundling members, is arranged along a length direction of the bundle of optical fibers so as to be wound on an outer circumference of the bundle of optical fibers. The first bundling member is joined with a second bundling member (Continued)

at a contact point where the first bundling member contacts the second bundling member, and is joined with a third bundling member, which is different from the second bundling member, at a contact point where the first bundling member contacts the third bundling member. The first bundling member's winding direction with respect to the bundle of optical fibers is reversed at the contact point with the second bundling member and at the contact point with the third bundling member.

11 Claims, 11 Drawing Sheets

(56) References Cited

U.S. PATENT DOCUMENTS

| | | | | |
|---|---|---|---|---|
| 6,122,427 | A * | 9/2000 | Yokokawa | G02B 6/4408 385/110 |
| 6,707,558 | B2 * | 3/2004 | Bennett | G01R 15/246 356/465 |
| 7,099,542 | B2 * | 8/2006 | Ledbetter | G02B 6/4494 385/100 |
| 7,200,307 | B2 * | 4/2007 | Bau' | G02B 6/4484 264/1.28 |
| 2015/0185428 | A1 * | 7/2015 | Tani | G02B 6/441 428/373 |
| 2015/0192748 | A1 * | 7/2015 | Sato | G02B 6/4403 385/114 |
| 2016/0159607 | A1 * | 6/2016 | Takagi | B65H 54/02 242/476.7 |

FOREIGN PATENT DOCUMENTS

| | | |
|---|---|---|
| JP | 2011-169939 A | 9/2011 |
| JP | 2012-88454 A | 5/2012 |
| JP | 2012-128304 A | 7/2012 |
| JP | 2012-212097 A | 11/2012 |
| JP | 2013-109171 A | 6/2013 |

OTHER PUBLICATIONS

Taiwanese Office Action of Taiwanese Patent Application No. 10421133470, dated Aug. 25, 2015.
International Search Report of PCT/JP2014/076259, dated Jan. 13, 2015. [PCT/ISA/210].
Written Opinion of PCT/JP2014/076259, dated Jan. 13, 2015. [PCT/ISA/237].
Australian Office Action of Australian Patent Application No. 2014333089, dated Aug. 6, 2016.

* cited by examiner

CABLE-END OPERATION

| PITCH | 10 mm | 20 mm | 30 mm | 40 mm | 50 mm | 60 mm | 80 mm | 100 mm | 150 mm | 200 mm | 250 mm |
|---|---|---|---|---|---|---|---|---|---|---|---|
| COMPARATIVE EXAMPLE 1 | GOOD | GOOD | GOOD | GOOD | GOOD | GOOD | GOOD | GOOD | GOOD | GOOD | FAIR |
| FIRST REFERENCE EXAMPLE | GOOD | GOOD | GOOD | GOOD | GOOD | GOOD | GOOD | GOOD | GOOD | GOOD | FAIR |

FIG. 7A

MID-SPAN BRANCHING

| PITCH | 10 mm | 20 mm | 30 mm | 40 mm | 50 mm | 60 mm | 80 mm | 100 mm | 150 mm | 200 mm | 250 mm |
|---|---|---|---|---|---|---|---|---|---|---|---|
| COMPARATIVE EXAMPLE 1 | POOR | POOR | POOR | POOR | POOR | POOR | GOOD | GOOD | GOOD | GOOD | FAIR |
| FIRST REFERENCE EXAMPLE | POOR | FAIR | GOOD | GOOD | GOOD | GOOD | GOOD | GOOD | GOOD | GOOD | FAIR |

FIG. 7B

EVALUATION RESULTS OF TRANSMISSION CHARACTERISTICS OF SAMPLE CABLES

| BUNDLING METHOD | | NUMBER (BUNDLING METHOD) OF BUNDLING MEMBERS | ANGLE OF BUNDLING MEMBER'S PATH IN CROSS SECTION [DEGREES] | TRANSMISSION LOSS WHILE SUBJECTED TO THERMAL ENVIRONMENT [dB/km] | | | AMOUNT OF INCREASE IN LOSS WHILE SUBJECTED TO THERMAL ENVIRONMENT [dB/km] | RESULT |
|---|---|---|---|---|---|---|---|---|
| | | | | +20°C (INITIAL VALUE) | −30°C | +70°C | | |
| ONE DIRECTION | | SINGLE-WIND | 360° | 0.35 | 0.33 | 0.66 | 0.31 | POOR |
| | | CROSS-WOUND | 360° | 0.44 | 0.39 | 0.72 | 0.28 | POOR |
| S-Z | | 2 | 270° | 0.33 | 0.29 | 0.54 | 0.21 | POOR |
| | | | 225° | 0.31 | 0.25 | 0.49 | 0.18 | POOR |
| | | | 180° | 0.25 | 0.22 | 0.32 | 0.07 | POOR |
| | | 2 | 240° | 0.31 | 0.27 | 0.47 | 0.16 | POOR |
| | | | 180° | 0.24 | 0.21 | 0.29 | 0.05 | GOOD |
| | | 3 | 120° | 0.21 | 0.21 | 0.22 | 0.01 | GOOD |
| | | | 180° | 0.23 | 0.22 | 0.25 | 0.02 | GOOD |
| | | | 120° | 0.21 | 0.20 | 0.22 | 0.01 | GOOD |
| | | 4 | 90° | 0.20 | 0.20 | 0.21 | 0.01 | GOOD |

FIG. 16

OPTICAL FIBER UNIT, OPTICAL FIBER BRANCHING METHOD, AND OPTICAL FIBER CABLE

CROSS REFERENCE TO RELATED APPLICATIONS

This application is a National Stage of International Application No. PCT/JP2014/076259 filed Oct. 1, 2014, claiming priority based on Japanese Patent Application No. 2013-210084, filed Oct. 7, 2013, the contents of all of which are incorporated herein by reference in their entirety.

TECHNICAL FIELD

The present invention relates to an optical fiber unit, an optical fiber branching method, and an optical fiber cable.

BACKGROUND ART

Techniques are known for forming an optical fiber cable including optical fiber units which are optical fiber aggregates formed by bundling a plurality of optical fibers. In such techniques, it is common to employ a method wherein a rough winding string (bundling member) is wound around the bundle of optical fibers to thereby suppress/prevent the bundle of optical fibers from falling apart while allowing the optical fiber units to be differentiated from one another by the colors of the bundling members.

In relation to such bundling members, Patent Literature 1 discloses a technique in which a plurality of bundling members are wound helically around a bundle of optical fibers and the bundling members are joined together, to thereby tie the bundle of optical fibers together. Patent Literature 2 (particularly FIG. 7 of Patent Literature 2) discloses a technique wherein the circumference of a bundle of a plurality of optical fibers is bundled with two bundling members by winding the two bundling members in an S-Z configuration, and the two bundling members are bonded and fixed together at sections where their winding directions are reversed.

CITATION LIST

Patent Literature

Patent Literature 1: JP 2011-169939A
Patent Literature 2: JP 2012-88454A

SUMMARY OF INVENTION

Technical Problem

Conventional methods, however, may result in poor workability at the time of extracting a desired optical fiber from an optical fiber unit. For example, in Patent Literature 1, a plurality of bundling members are wound helically on the circumference of a bundle of optical fibers, and the bundling members are joined together at their intersection points. Thus, in performing mid-span branching for extracting a specific optical fiber, the joined sections between the bundling members need to be disengaged. At that time, the bundling members need to be retrieved helically, which increases the time and effort for extracting the optical fiber. Also, at the time of retrieving the bundling members, there is a possibility that the optical fibers may break as a result of e.g. the worker's finger getting caught in the optical fibers.

Moreover, in cases where a bundling member is wound helically on the circumference of a bundle of optical fibers, or in cases where two bundling members are wound in an S-Z configuration around the circumference of the bundle of optical fibers as in Patent Literature 2, the optical fibers may meander when tension is applied to the bundling member(s), resulting in a possibility of increased transmission loss.

An objective of the invention is to improve workability at the time of extracting optical fibers in an optical fiber unit in which a bundle of optical fibers is bundled by bundling members, and to suppress/prevent an increase in transmission loss even when tension is applied to the bundling members.

Solution to Problem

A primary aspect of the invention for achieving the aforementioned objective is an optical fiber unit including: a plurality of optical fibers; and at least three bundling members that bundle the plurality of optical fibers into a bundle. A first bundling member, among the plurality of bundling members, is arranged along a length direction of the bundle of the optical fibers so as to be wound on an outer circumference of the bundle of the optical fibers. The first bundling member is joined with a second bundling member at a contact point where the first bundling member contacts the second bundling member, and is joined with a third bundling member at a contact point where the first bundling member contacts the third bundling member, the third bundling member being different from the second bundling member. The first bundling member's winding direction with respect to the bundle of the optical fibers is reversed at the contact point with the second bundling member and at the contact point with the third bundling member.

Other features of the invention are made clear by the following description and the drawings.

Advantageous Effects of Invention

With the present invention, it is possible to improve workability at the time of extracting optical fibers in an optical fiber unit in which a bundle of optical fibers is bundled by bundling members, and to suppress/prevent an increase in transmission loss even when tension is applied to the bundling members.

BRIEF DESCRIPTION OF DRAWINGS

FIG. 7A is a table showing results comparing the first reference example and Comparative Example 1 regarding workability in a cable-end operation, and FIG. 7B is a table showing results comparing the first reference example and Comparative Example 1 regarding workability in mid-span branching.

FIG. 16 is a table showing evaluation results of transmission loss.

DESCRIPTION OF EMBODIMENTS

Figure 1:
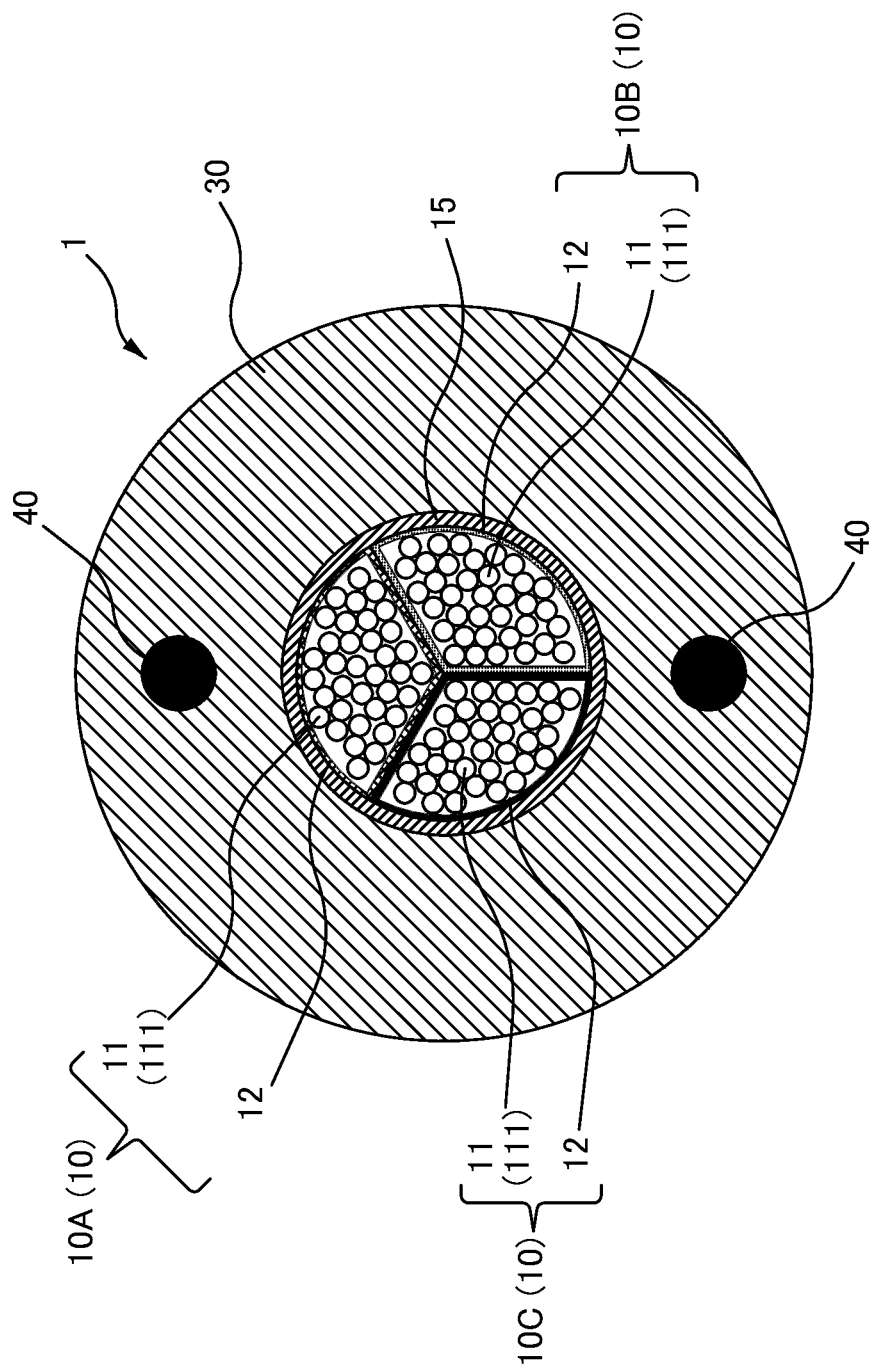
FIG. 1 is a cross-sectional view of an optical fiber cable 1 according to a first reference example.

At least the following matters are made clear from the following description and the drawings.

Disclosed is an optical fiber unit including: a plurality of optical fibers; and at least three bundling members that bundle the plurality of optical fibers into a bundle. A first bundling member, among the plurality of bundling members, is arranged along a length direction of the bundle of the optical fibers so as to be wound on an outer circumference of the bundle of the optical fibers. The first bundling member is joined with a second bundling member at a contact point where the first bundling member contacts the second bundling member, and is joined with a third bundling member at a contact point where the first bundling member contacts the third bundling member, the third bundling member being different from the second bundling member. The first bundling member's winding direction with respect to the bundle of the optical fibers is reversed at the contact point with the second bundling member and at the contact point with the third bundling member.

With this optical fiber unit, it is possible to improve workability at the time of extracting optical fibers, and to suppress/prevent an increase in transmission loss even when tension is applied to the bundling members.

In the aforementioned optical fiber unit, it is preferable that the plurality of optical fibers are bundled by four bundling members. With this optical fiber unit, it is possible to suppress/prevent an increase in transmission loss even when tension is applied to the bundling members.

In the aforementioned optical fiber unit, it is preferable that the bundling members are arranged evenly along the length direction of the bundle of the optical fibers such that each bundling member depicts an arc covering one-fourth of the circumference of the bundle. With this optical fiber unit, it is possible to suppress/prevent an increase in transmission loss even when tension is applied to the bundling members.

In the aforementioned optical fiber unit, it is preferable that, as viewed from one of the contact points, another one of the contact points is present on the opposite side of the bundle. With this optical fiber unit, force applied to the optical fibers is canceled out, and the optical fibers can be suppressed/prevented from meandering.

In the aforementioned optical fiber unit, it is preferable that, when a cross section of the optical fiber unit is viewed from the length direction of the bundle of the optical fibers, a polygon is formed by lines that each connect the two contact points of each of the bundling members. With this optical fiber unit, deformation in which the optical fibers bend to the inside of the polygon is less likely to occur, and thus, the optical fibers are less likely to meander. As a result, it is possible to suppress/prevent an increase in transmission loss.

In the aforementioned optical fiber unit, it is preferable that the range over which each bundling member is wound with respect to the bundle of the optical fibers is less than or equal to half the outer circumference of the bundle of the optical fibers. With this optical fiber unit, deformation of the optical fibers can be further suppressed.

In the aforementioned optical fiber unit, it is preferable that: an optical fiber ribbon is formed by a plurality of the optical fibers that are arranged side by side; and connection parts that each connect two adjacent ones of these optical fibers are arranged intermittently in a length direction and a width direction of the optical fiber ribbon.

With this optical fiber unit, the optical fibers are easier to handle and easier to manage because a plurality of optical fibers are gathered into a ribbon.

Also disclosed is an optical fiber branching method involving: peeling off the first bundling member from the aforementioned optical fiber unit, to thereby enable a predetermined optical fiber to be extracted from the bundle of the optical fibers.

Also disclosed is an optical fiber cable including a plurality of the aforementioned optical fiber units, the optical fiber units being housed inside the optical fiber cable.

Further, at least the following matters are also made clear from the following description and the drawings.

Disclosed is an optical fiber unit including: a plurality of optical fibers; and a plurality of bundling members that bundle the plurality of optical fibers into a bundle. A first bundling member, among the plurality of bundling members, is arranged along a length direction of the bundle of the optical fibers so as to be wound on an outer circumference of the bundle of the optical fibers. The first bundling member is joined with a second bundling member at a contact point where the first bundling member contacts the second bundling member. The first bundling member's winding direction with respect to the bundle of the optical fibers is reversed at the contact point.

With this optical fiber unit, it is possible to improve workability at the time of extracting optical fibers.

In the aforementioned optical fiber unit, it is preferable that the range over which each bundling member is wound with respect to the bundle of the optical fibers is less than one round around the outer circumference of the bundle of the optical fibers.

With this optical fiber unit, there is no need to e.g. retrieve the bundling members helically, and the bundling member can be peeled off easily, simply by being pulled in a predetermined direction. Thus, mid-span branching etc. of the optical fiber cable is facilitated.

In the aforementioned optical fiber unit, it is preferable that the first bundling member's winding direction with respect to the outer circumference of the bundle of the optical fibers is in the reverse direction from the second bundling member's winding direction with respect to the outer circumference of the bundle of the optical fibers.

With this optical fiber unit, the bundling members can be peeled off easily from the bundle of optical fibers by pulling the two bundling members in mutually opposite directions.

In the aforementioned optical fiber unit, it is preferable that the second bundling member is arranged rectilinearly along the length direction of the bundle of the optical fibers.

With this optical fiber unit, the bundling member can be peeled off easily from the bundle of optical fibers by pulling one of the two bundling members.

In the aforementioned optical fiber unit, it is preferable that, in the length direction of the bundle of the optical fibers, the distance between two adjacent joined points between the first bundling member and the second bundling member is from 30 mm to 200 mm inclusive.

With this optical fiber unit, it is possible to improve workability at the time of extracting optical fibers during mid-span branching etc.

{First Reference Example}

Structure of Optical Fiber Unit:

The first reference example describes: an optical fiber unit constituted by a plurality of optical fibers; and an optical fiber cable including these optical fiber units. FIG. 1 is a cross-sectional view of an optical fiber cable 1 according to the first reference example.

This optical fiber cable 1 includes: optical fiber units 10 (10A to 10C); a sheath 30; and tension members 40. Each optical fiber unit 10 is structured so that, by tying a plurality of optical fibers 111 into a bundle with bundling members 12, the optical fibers 111 are prevented from falling apart. In FIG. 1, the optical fiber cable 1 is constituted by three optical fiber units 10, i.e., optical fiber units 10A, 10B, 10C, but the number of optical fiber units 10 included in a single optical fiber cable 1 may be varied as appropriate depending on e.g. the use of the cable. The circumference of the optical fiber units 10A to 10C is covered by a wrapping 15 formed of e.g. a nonwoven fabric, and the outer circumferential part thereof is covered by a sheath 30 which is the outer covering of the optical fiber cable 1. Tension members 40 are provided in the sheath 30.

Figure 2:
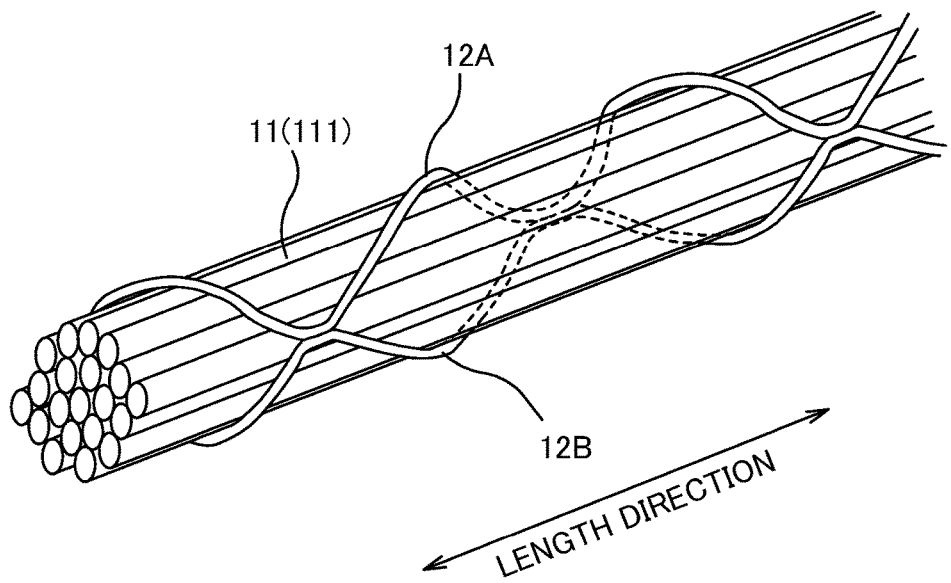
FIG. 2 is a schematic diagram of an optical fiber unit 10 according to the first reference example.
Figure 3:
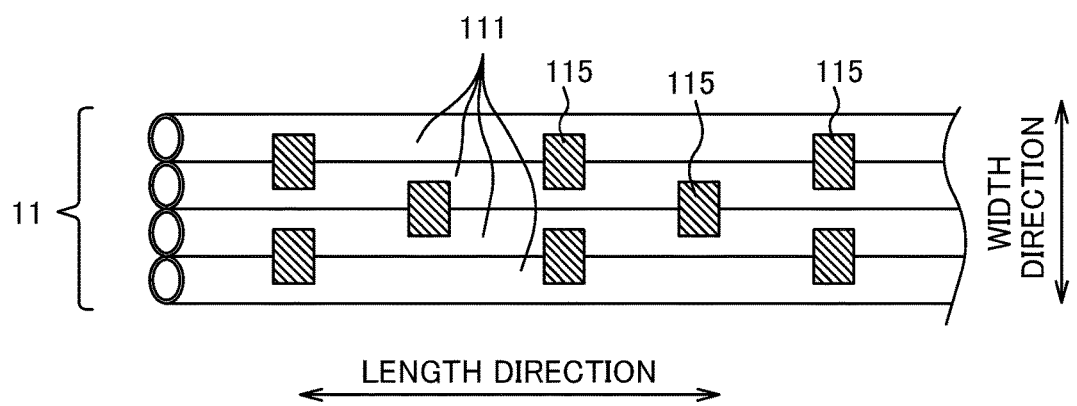
FIG. 3 is a schematic diagram of an intermittently connected fiber ribbon 11.

Optical Fiber Unit 10:

FIG. 2 is a schematic diagram of the optical fiber unit 10. FIG. 3 is a schematic diagram of an intermittently connected fiber ribbon 11.

The optical fiber unit 10 of the first reference example is made by: closely gathering intermittently connected fiber ribbons 11, each constituted by a plurality of optical fibers 111, into a bundle; and tying the bundle together by winding bundling members 12 on the circumference of the bundle.

The intermittently connected fiber ribbon 11 is what is called an optical fiber ribbon wherein the optical fibers 111 are formed into a ribbon (tape) form by: arranging a plurality of optical fibers 111 side by side; and gathering the optical fibers by connecting two adjacent optical fibers 111 with connection parts 115. In FIG. 3, the intermittently connected fiber ribbon 11 is formed by four optical fibers 111, but the number of optical fibers 111 for forming the intermittently connected fiber ribbon 11 is not limited thereto.

Each optical fiber 111 is formed by covering the outer circumference of a bare fiber, which is a transmission path for transmitting light, with two cover layers (soft and hard). The bare fiber is made, for example, of a glass material having a diameter of 125 μm. Each cover layer is made, for example, of an ultraviolet-curable resin or a thermosetting resin. A coloring layer is formed on the cover layer; the color of the coloring layer allows the plurality of optical fibers 111 to be differentiated from one another according to color. In the first reference example, the diameter of the optical fiber 111 including the coloring layer is approx. 250 μm. Note that the hard layer itself, of the two cover layers, may be colored, without forming the coloring layer.

The connection part 115 is a member that connects two optical fibers 111 adjacent to one another in the width direction. As illustrated in FIG. 3, in the intermittently connected fiber ribbon 11, a plurality of connection parts 115 are arranged intermittently in the length direction and the width direction of the optical fibers 111. A predetermined separation distance is provided in the width direction between two adjacent optical fibers 111. The intermittently connected fiber ribbon 11 is foldable in the width direction at the sections of the connection parts 115, and can thus be formed into a bundle as illustrated in FIG. 2.

It should be noted that the first reference example encompasses optical fiber units 10 wherein a plurality of optical fibers 111 are separately gathered into a bundle by the bundling members 12, instead of forming the optical fibers 111 into a ribbon (tape) form.

The bundling member 12 is a member for bundling the intermittently connected fiber ribbons 11 (the plurality of optical fibers 111), and a plurality of bundling members 12 are provided in a single optical fiber unit 10. As illustrated in FIG. 2, the optical fiber unit 10 of the first reference example is provided with two bundling members 12, i.e., bundling members 12A and 12B.

Figure 4:
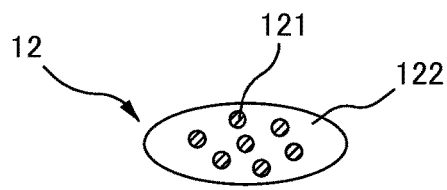
FIG. 4 is a diagram illustrating a cross-sectional structure of a bundling member 12.

FIG. 4 is a diagram illustrating a cross-sectional structure of the bundling member 12. The bundling member 12 includes: a plurality of core parts 121 extending along the length direction of the optical fiber unit 10; and a cover part 122 that covers the outer circumference of each of the core parts 121 and that has a lower melting point than the melting point of the core parts 121. The bundling members 12A and 12B can be thermally fusion-bonded at contact points therebetween by the adhesiveness that arises by heating the cover part 122 at a temperature equal to or higher than the melting point. Preferably, the difference between the melting point of the core part 121 and the melting point of the cover part 122 is 20° C. or greater. The melting point of the core part 121 is preferably approx. 160° C., and the melting point of the cover part 122 is preferably approx. from 90° C. to 130° C. The requirements for the cover part 122 are that: even when the cover part is heated and molten, the cover part 122 either does not bond with the optical fibers 111 or has a weak adhesive force even if it bonds with the optical fibers; and the cover part does not cause degradation of the cover layer(s) of the optical fibers 111.

As for the core parts 121 and the cover part 122, it is possible to use, for example, a high melting point resin such as polypropylene (PP), polyamide (PA) or polyethylene terephthalate (PET), or a high melting point fiber such as polypropylene fiber, polyamide fiber (e.g. nylon (registered trademark)) or polyester fiber (e.g. PET fiber), or a high melting point tape or film made of e.g. PET or PP, covered by: a thermoplastic resin which is capable of reversibly repeating softening and hardening by heating and cooling, e.g. a low melting point resin such as polyethylene (PE), ethylene-vinyl acetate copolymer (EVA) or ethylene-ethyl acrylate copolymer (EEA); or a hot-melt adhesive which employs a thermoplastic resin or rubber as a base and which is capable of reversibly repeating softening and hardening by heating and cooling.

It should be noted that the bundling members 12A and 12B do not have to be a composite material of a high melting point material (core parts 121) and a low melting point material (cover part 122) as illustrated in FIG. 4, and instead may be constituted by a single material. For example, each bundling member may be constituted by either a high melting point material or a low melting point material; also, the bundling members 12A and 12B may be constituted by different materials.

The joining of the bundling member 12A and the bundling member 12B does not have to be by thermal fusion-bonding, but may be achieved by using an adhesive. Examples of adhesives that may be used for joining/bonding the bundling members include reactive adhesives such as epoxy-based adhesives and modified olefin-based adhesives employing ultraviolet-curable resins and/or solvents.

The two bundling members 12A and 12B are provided with unique colors to allow the optical fiber units 10 to be differentiated from one another. For example, in FIG. 1, three optical fiber units—i.e., optical fiber units 10A to 10C—are housed inside the optical fiber cable 1. In this case, by applying predetermined colors to the bundling members 12 to be wound on the respective optical fiber units 10A to 10C, the optical fiber units 10A to 10C can be differentiated easily from one another.

Figure 5:
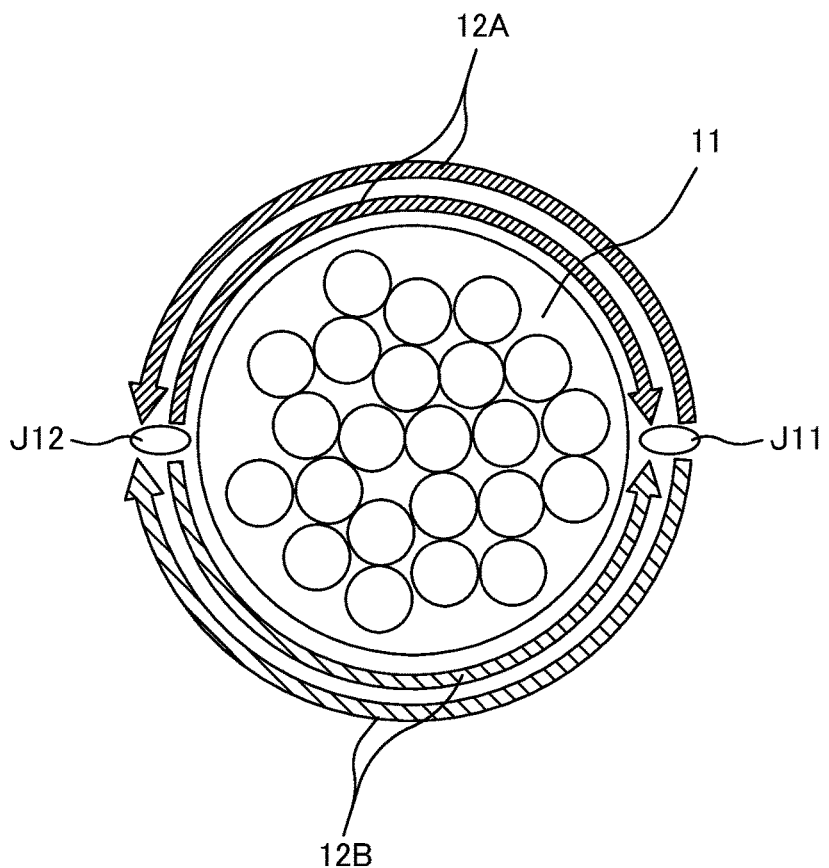
FIG. 5 is a cross-sectional view illustrating how the bundling members 12 are wound in the first reference example.

FIG. 5 is a cross-sectional view illustrating how the bundling members 12 are wound in the first reference example. In the first reference example, the bundling member 12A is wound on the outer circumference of the bundle of intermittently connected fiber ribbons 11 (plurality of optical fibers 111) and is arranged along the length direction of the bundle of optical fibers 111 such that the bundling member depicts an arc covering half the circumference of the bundle (cf. FIG. 2). On the other hand, the bundling member 12B is arranged so as to depict an arc covering half the circumference of the bundle in the opposite direction from the bundling member 12A. The bundling member 12A and the bundling member 12B are joined at each contact point where the bundling member 12A and the bundling member 12B contact one another. After the bundling members are joined at the contact point, the bundling member 12A's winding direction, as well as the bundling member 12B's winding direction, with respect to the bundle of optical fibers 111 is reversed.

In the case of FIG. 5, the bundling member 12A is wound clockwise on the upper side of the outer circumference of the bundle of intermittently connected fiber ribbons 11, whereas the bundling member 12B is wound counterclockwise on the lower side of the outer circumference of the bundle of intermittently connected fiber ribbons 11. Then, after the bundling members are joined at contact point J11, their winding directions are reversed; the bundling member 12A is wound counterclockwise on the upper side of the outer circumference of the bundle of intermittently connected fiber ribbons 11, whereas the bundling member 12B is wound clockwise on the lower side of the outer circumference of the bundle of intermittently connected fiber ribbons 11. Then, the bundling members are again joined at contact point J12 located on the opposite side from the contact point J11 with respect to the bundle of intermittently connected fiber ribbons 11. By repeating this operation, the state as illustrated in FIG. 2 is achieved.

The strength of the joined section between the bundling members 12A and 12B is preferably of a degree where the joined section does not get inadvertently disengaged, but can be disjoined easily with the hands whenever desired. In this way, at the time of mid-span branching in which a specific optical fiber 111 is extracted from the bundle of optical fibers 111 included in an optical fiber cable, the joined/bonded section can be disjoined with the hands and the extraction site can be widened, without cutting the bundling members 12A and 12B. Moreover, in cases where the joining strength is less than or equal to the breaking strength of each bundling member, preferably less than or equal to the yield point strength, the bundling members 12 can be peeled off without elongating and breaking.

It should be noted that the two bundling members 12A and 12B can be re-joined by applying heat with a heater or by applying an adhesive after the extraction of an optical fiber 111 in mid-span branching.

Sheath 30:

The sheath 30 covers the outer circumferential part of the optical fiber units 10, which are wrapped by a wrapping 15, and protects the optical fiber units 10 located on the inside (FIG. 1). The sheath 30 is made e.g. of a resin such as polyethylene resin.

Tension Member 40:

The tension member 40 is a tensile member for preventing tension applied to the optical fiber cable 1 from being directly transmitted to the optical fibers 111 (FIG. 1). Each tension member 40 is made e.g. of a steel wire.

Workability in Mid-Span Branching Etc.:

By employing a comparative example, verification tests were performed regarding the workability in mid-span branching wherein a specific optical fiber 111 is extracted by peeling off the sheath 30 at a midpoint of the optical fiber cable 1 in the length direction, and the workability in a cable-end operation wherein a specific optical fiber 111 is extracted from an end of the optical fiber cable 1 in the length direction.

Figure 6:
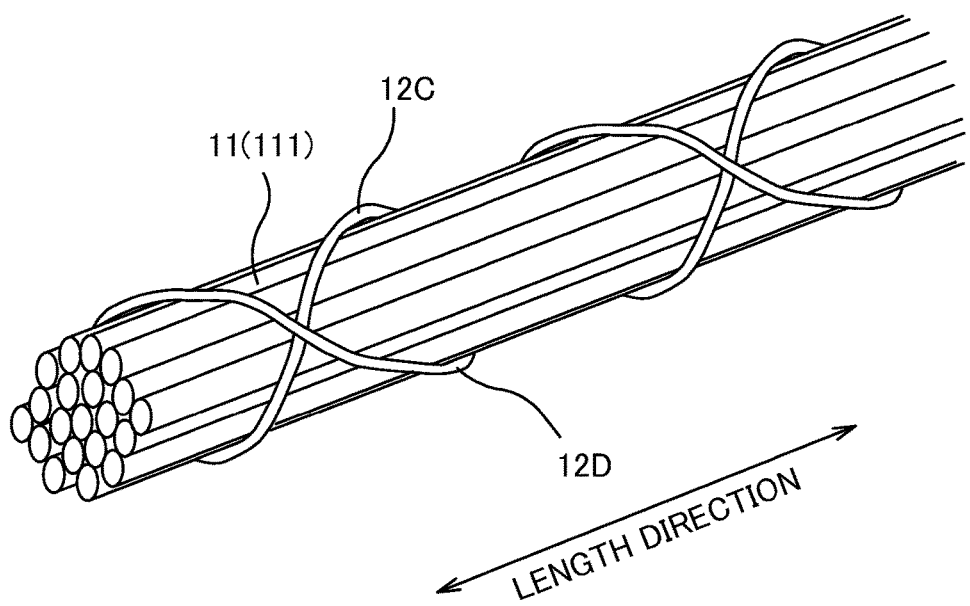
FIG. 6 is a diagram illustrating an optical fiber unit according to Comparative Example 1.

FIG. 6 is a diagram illustrating an optical fiber unit according to Comparative Example 1. In the optical fiber unit of Comparative Example 1, the way the bundling members 12 are wound is different from that in the optical fiber unit 10 of the first reference example (FIG. 2). The other features are substantially the same as those in the optical fiber unit 10. As illustrated in FIG. 6, Comparative Example 1 includes two bundling members, i.e., bundling members 12C and 12D. The bundling members 12C and 12D are wound helically around the bundle of intermittently connected fiber ribbons 11 (plurality of optical fibers 111) in opposite directions from one another. The bundling members 12C and 12D are joined together by thermal fusion-bonding at sections (contact points) where the bundling members intersect with one another.

With respect to an optical fiber cable according to Comparative Example 1 including the aforementioned optical fiber units and the optical fiber cable 1 according to the first reference example, tests were conducted regarding workability in mid-span branching and in cable-end operation by changing the winding pitch of the bundling members 12. Note that "winding pitch" refers to the distance between two adjacent joined points between the bundling members 12 in the length direction of the optical fiber unit.

FIGS. 7A and 7B show verification results for each operation. FIG. 7A is a table showing evaluation results comparing the first reference example and Comparative Example 1 regarding workability in a cable-end operation. FIG. 7B is a table showing evaluation results comparing the first reference example and Comparative Example 1 regarding workability in mid-span branching. In both cases, GOOD indicates that the operation can be conducted easily, POOR indicates that the operation is difficult to conduct, and FAIR indicates that operation is possible but is poorer in workability than GOOD.

In the cable-end operation shown in FIG. 7A, the workability was FAIR for both the first reference example and Comparative Example 1 in cases where the winding pitch of the bundling members 12 was 250 mm or longer. This is because, by widening the winding pitch, the visibility of the bundling members 12 is impaired and the optical fiber units become difficult to differentiate from one another, thus resulting in reduced workability. In other cases (i.e., in cases where the winding pitch was 200 mm or less), the workability was GOOD for both the first reference example and Comparative Example 1, indicating that both examples had good workability. In the cable-end operation, even when the sheath 30 at the cable's end section is peeled off and the bundling members 12 are pulled toward the opposite side from the cable end, the bundling members 12 are less prone to disengage from the bundle of intermittently connected fiber ribbons 11 (plurality of optical fibers 111). Thus, there is not much difference in workability between the first reference example and Comparative Example 1, even though the methods for winding the bundling members 12 are different.

Next, in mid-span branching shown in FIG. 7B, as in the cable-end operation, the workability was FAIR for both the first reference example and Comparative Example 1 in cases where the winding pitch of the bundling members 12 was 250 mm or longer. This is because widening the winding pitch impairs the visibility of the bundling members 12. On the other hand, there was a significant difference between the first reference example and Comparative Example 1 in cases where the winding pitch was 60 mm or less.

In Comparative Example, the workability was POOR in cases where the winding pitch was 60 mm or less. In cases where the distance of the winding pitch of the bundling members 12 is 60 mm or less, the work space during mid-span branching is too small; thus, it is difficult to extract a specific optical fiber 111 from between the joined sections of the bundling members 12 in a state where the bundling members are still wound around the bundle. In such cases, it is necessary to peel off the bundling members 12 at the work section and expose the bundle of intermittently connected fiber ribbons 11 (plurality of optical fibers 111). In Comparative Example 1, the bundling members 12C and 12D are each wound helically (FIG. 6); thus, in order to expose the optical fibers 111, there is a need to first peel apart the joined sections of the bundling members 12C and 12D, and then retrieve each bundling member helically. This requires time and effort to extract an optical fiber 111 at a midpoint section, in the length direction, of the optical fiber cable 1. Also, in the retrieving operation, there is a possibility that the optical fibers 111 may break as a result of e.g. the worker's finger getting caught in the optical fibers.

In contrast, in the optical fiber cable 1 of the first reference example, the workability was GOOD even in cases where the winding pitch was 60 mm or less. This is because the way the bundling members 12 are wound in the first reference example is easier to peel than the way the bundling members 12 are wound in Comparative Example 1, and it is easy to expose the optical fibers 111. As illustrated in FIGS. 2 and 5, the bundling members 12A and 12B of the optical fiber cable 1 are wound so as to depict an arc covering half the bundle's circumference. Therefore, by pulling the bundling members 12A and 12B in mutually opposite directions, the bundle of intermittently connected fiber ribbons 11 (plurality of optical fibers 111) can be exposed easily while peeling the joined section. For example, in FIG. 5, the bundling members can be peeled off easily by pulling the bundling member 12A upward and pulling the bundling member 12B downward. Stated differently, the range over which each bundling member 12 is wound with respect to the bundle of intermittently connected fiber ribbons 11 is less than one round around the outer circumference of the bundle of intermittently connected fiber ribbons 11. Thus, there is no need to retrieve the bundling members helically, and the bundling members can be removed easily, simply by pulling one bundling member (e.g. the bundling member 12A) in a direction that allows this bundling member to be peeled from the other bundling member (e.g. the bundling member 12B) to which the aforementioned bundling member is joined. Thus, the work efficiency in mid-span branching is excellent, even in cases where the winding pitch is short.

It should be noted that, even in the optical fiber cable 1 of the first reference example, the workability rating was FAIR or POOR in a range where the winding pitch was 20 mm or less. This is because, depending on the thickness of the worker's fingers, it may be difficult to pinch the bundling members 12 in cases where the distance is around 20 mm.

From the aforementioned results, it is understood that mid-span branching etc. can be performed efficiently in a range where the winding pitch of the bundling members 12 is from 30 mm to 200 mm.

As described above, with the optical fiber unit 10 according to the first reference example, it is possible to improve workability at the time of extracting optical fibers 111.

Modified Example

In an optical fiber cable according to a modified example, the method according to which the optical fiber units 10 are housed is different. The configuration of each optical fiber unit 10 and each bundling member 12 is substantially the same as in the first reference example.

Figure 8:
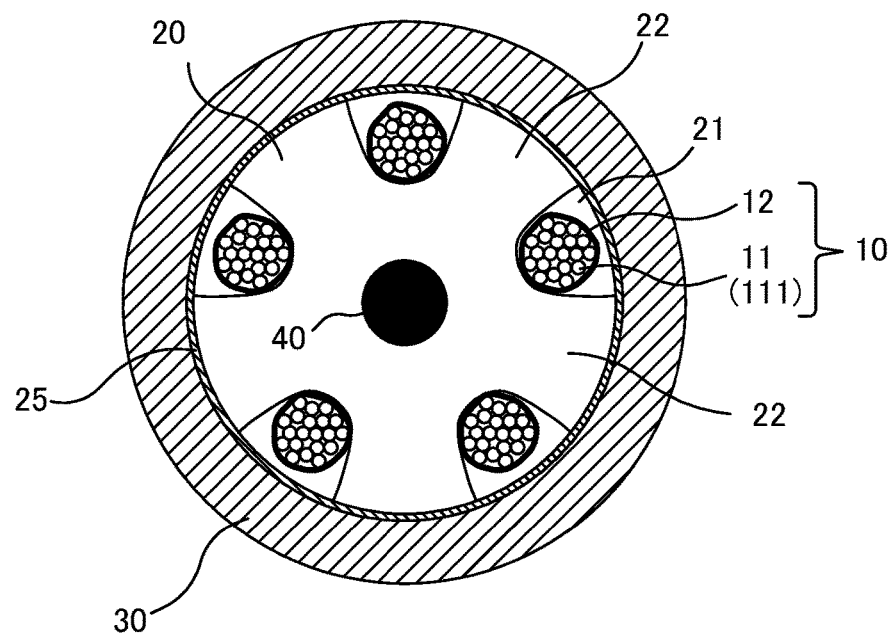
FIG. 8 is a cross-sectional view of an optical fiber cable according to a modified example of the first reference example.

FIG. 8 is a cross-sectional view of an optical fiber cable according to a modified example of the first reference example. The optical fiber cable of the modified example is what is referred to as a slot-type optical fiber cable. A slot-type optical fiber cable is an optical fiber cable having a structure in which slots, or grooves, for housing optical fiber ribbons or separate optical fibers are provided inside the optical fiber cable.

The optical fiber cable of the modified example includes: optical fiber units 10; a slotted core 20; a sheath 30; and a tension member 40. The functions of the various members other than the slotted core 20 are as described in FIG. 1.

The slotted core 20 is a member serving as a base part of the optical fiber cable of the modified example, and has a plurality of slots 21 formed in the outer circumference at predetermined intervals. In the optical fiber cable illustrated in FIG. 8, five slots 21 are provided at regular intervals in the outer circumferential part of the slotted core 20. Each slot 21 is a groove that is opened outward (toward the outer circumference side) in the radial direction of the slotted core 20. Ribs 22 are formed on respective sides of each slot 21. An optical fiber unit 10 gathered into a bundle is housed in each slot 21. In FIG. 8, the slot 21 is formed in a substantially U-shape, which allows the bundled optical fiber unit 10 to be housed easily. The number and the shape of the slots 21 provided in the slotted core 20 may be changed as appropriate depending on, for example, the thickness of the optical fiber cable or the number of optical fibers 111 to be housed.

In the modified example, the slots 21 are formed so as to depict a unidirectional helix with respect to the slotted core 20's axial direction (the optical fiber cable's length direction). Alternatively, the slots 21 may be formed so as to depict what is called an S-Z helical pattern in which the slots 21 are formed so as to alternately and repeatedly depict S-twists and Z-twists periodically. In this case, the optical fiber cable may also be referred to as an S-Z-slotted optical fiber cable.

A slot wrapping 25 is provided between the slotted core 20 and the sheath 30. The slot wrapping 25 is a sheet-form member that covers the outer circumferential part of the slotted core 20 so as to envelop the same. By providing the slot wrapping 25, the sheath 30 can be prevented from sinking into the opening of each slot 21 from the outside.

Even in an optical fiber cable structured as above, the workability in mid-span branching can be improved by winding, with respect to each optical fiber unit 10 housed inside the cable, the bundling members 12 in the same way as in the first reference example.

{Second Reference Example}

The second reference example describes an example in which the way the bundling members are wound in an optical fiber unit is changed. The fundamental features of the optical fiber cable are substantially the same as in the first reference example.

Figure 9:
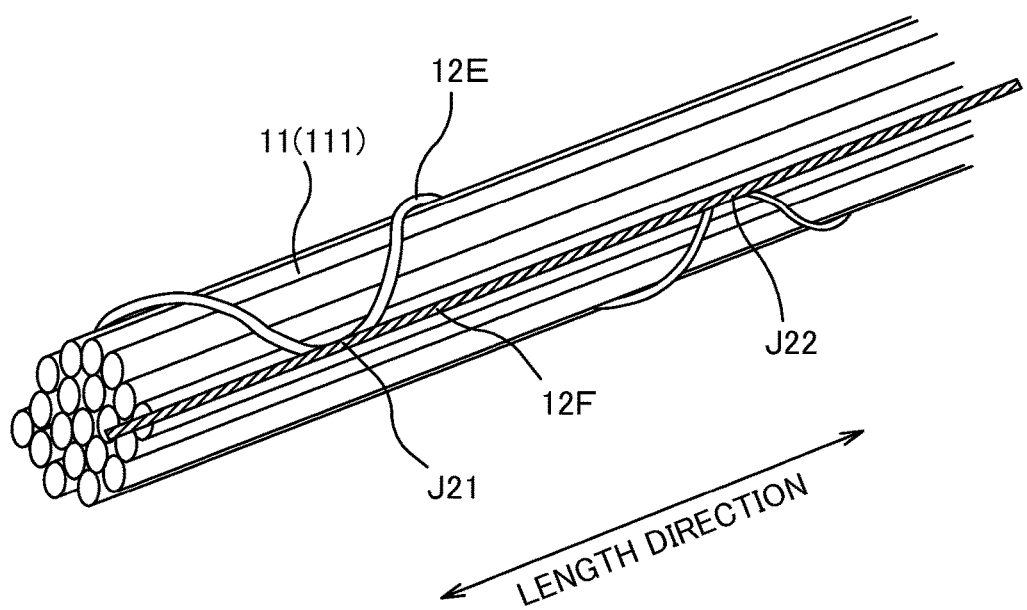
FIG. 9 is a schematic diagram of an optical fiber unit 10 according to a second reference example.
Figure 10:
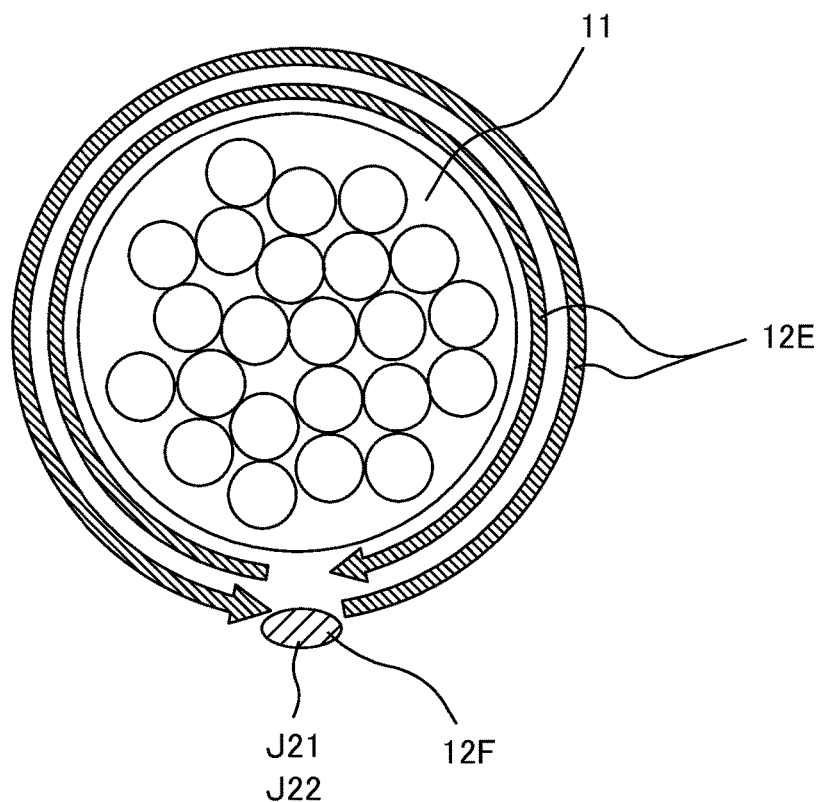
FIG. 10 is a cross-sectional view illustrating how the bundling members 12 are wound in the second reference example.

FIG. 9 is a schematic diagram of an optical fiber unit 10 according to the second reference example. FIG. 10 is a cross-sectional view illustrating how the bundling members 12 are wound in the second reference example. The optical fiber unit 10 of the second reference example includes two bundling members, i.e., bundling members 12E and 12F.

The bundling member 12E is wound on the outer circumference of the bundle of intermittently connected fiber ribbons 11 (plurality of optical fibers 111) and is arranged along the length direction of the bundle of the optical fibers 111 such that the bundling member depicts an arc covering one round of the circumference of the bundle (cf. FIG. 9). The bundling member 12F (illustrated with hatch lines in FIG. 9) is arranged rectilinearly along the length direction of the bundle of optical fibers 111. The bundling members 12E and 12F are joined at each contact point where the bundling member 12E and the bundling member 12F contact one another. After the bundling members are joined at the contact point, the bundling member 12E's winding direction with respect to the bundle of optical fibers 111 is reversed.

In the case of FIG. 10, the bundling member 12E is wound clockwise on the outer circumference of the bundle of intermittently connected fiber ribbons 11, and comes into contact at contact point J21 with the bundling member 12F arranged on the lower side of the bundle. Then, after the bundling members are joined at contact point J21, the bundling member 12E's winding direction is reversed; the bundling member 12E is wound counterclockwise on the outer circumference of the bundle of intermittently connected fiber ribbons 11, and again comes into contact with, and is joined to, the bundling member 12F at contact point J22. By repeating this operation, the state as illustrated in FIG. 9 is achieved.

The optical fiber unit 10 according to the second reference example also has excellent workability in mid-span branching and in cable-end operation. For example, in cases where the bundling members 12 need to be peeled off from the bundle of intermittently connected fiber ribbons 11 at the time of mid-span branching, it is only necessary to pull the bundling member 12E upward, or pull the bundling member 12F downward, in FIG. 10. In this way, the joined sections between the bundling members 12E and 12F are peeled apart, and the bundling members 12 can be peeled off easily from the bundle of intermittently connected fiber ribbons 11. More specifically, also in the second reference example, because the range over which each bundling member is wound with respect to the bundle of intermittently connected fiber ribbons 11 is less than one round, there is no need to e.g. retrieve the bundling members helically, and the bundling member can be peeled off easily simply by being pulled in a predetermined direction. Thus, the work efficiency in mid-span branching etc. is excellent.

{First Embodiment}

The first embodiment describes an example in which the number of bundling members in an optical fiber unit is increased. The fundamental features of the optical fiber cable are substantially the same as in the first reference example.

Figure 11:
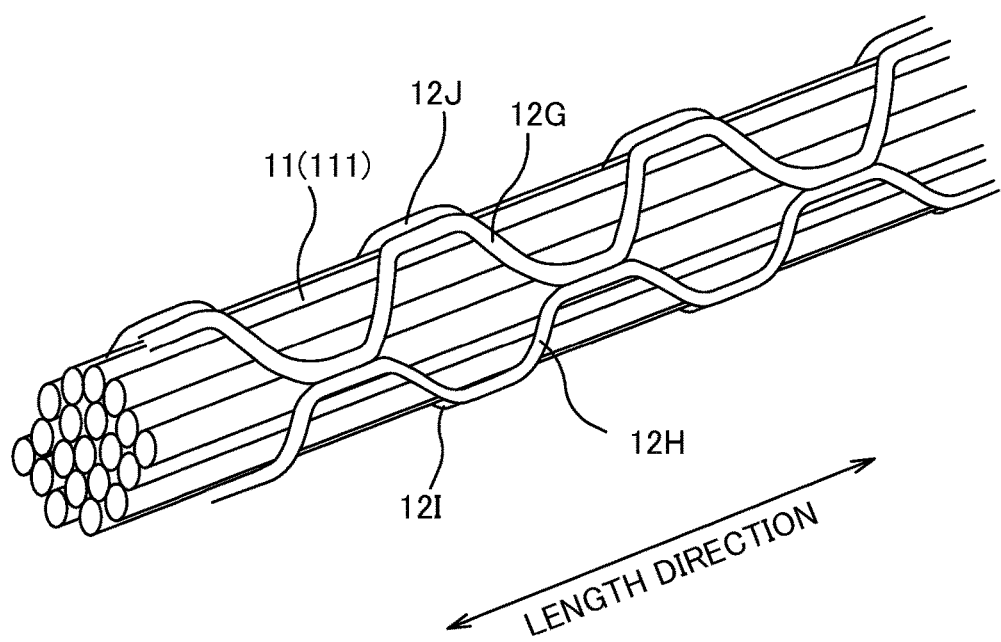
FIG. 11 is a schematic diagram of an optical fiber unit 10 according to a first embodiment.
Figure 12:
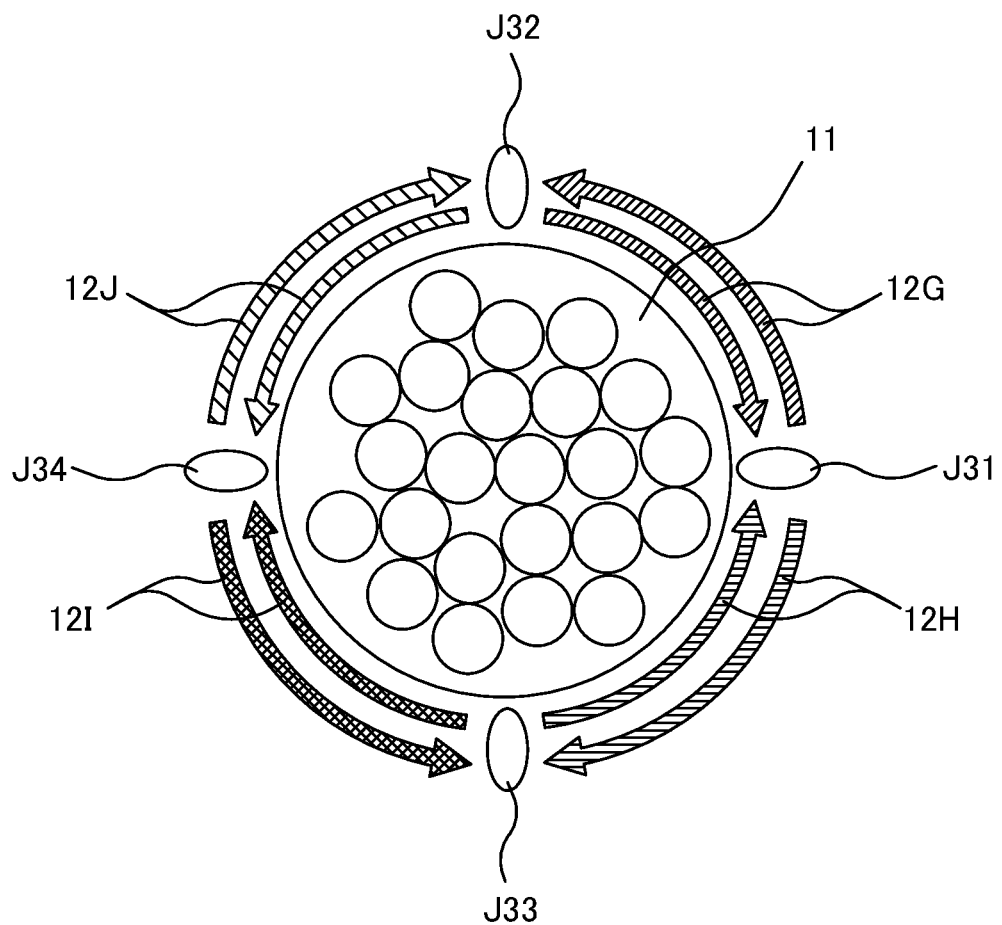
FIG. 12 is a cross-sectional view illustrating how the bundling members 12 are wound in the first embodiment.

FIG. 11 is a schematic diagram of an optical fiber unit according to the first embodiment. FIG. 12 is a cross-sectional view illustrating how the bundling members 12 are wound in the first embodiment. The optical fiber unit 10 according to the first embodiment includes four bundling members, i.e., bundling members 12G, 12H, 12I, and 12J.

The bundling member 12G is wound on the outer circumference of the bundle of intermittently connected fiber ribbons 11 (plurality of optical fibers 111) and is arranged along the length direction of the bundle of optical fibers 111 such that the bundling member depicts an arc covering one-fourth of the circumference of the bundle (cf. FIG. 9). Similarly, each of the bundling members 12H to 12J is wound on the outer circumference of the bundle of intermittently connected fiber ribbons 11 (plurality of optical fibers 111) and is arranged along the length direction of the bundle of optical fibers 111 such that the bundling member depicts an arc covering one-fourth of the circumference of the bundle. The bundling member 12G and the bundling member 12H are joined at each contact point where the bundling member 12G and the bundling member 12H contact one another, and at each joined point, the bundling member 12G's winding direction, as well as the bundling member 12H's winding direction, with respect to the bundle of optical fibers 111 is reversed. Also, the bundling member 12G and the bundling member 12J are joined at each contact point where the bundling member 12G and the bundling member 12J contact one another, and at each joined point, the bundling member 12G's winding direction, as well as the bundling member 12J's winding direction, with respect to the bundle of optical fibers 111 is reversed. When focusing on the bundling member 12G, the bundling member 12G (corresponding to the first bundling member) is joined with the bundling member 12H (corresponding to the second bundling member) at a contact point J31 where the bundling member 12G contacts the bundling member 12H, and is joined with the bundling member 12J (corresponding to the third bundling member) at a contact point J32 where the bundling member 12G contacts the bundling member 12J; and the bundling member 12G's winding direction with respect to the bundle of intermittently connected fiber ribbons 11 (plurality of optical fibers 111) is reversed at the contact point J31 and at the contact point J32. Similarly, for the other bundling members (e.g. the bundling member 12H), the bundling member is joined with an adjacent bundling member 12 (e.g. bundling member 12G) at a contact point where it contacts the adjacent bundling member, and is joined with another adjacent bundling member (e.g. bundling member 12I) at a contact point where it contacts this other bundling member; and the bundling member's winding direction with respect to the bundle of intermittently connected fiber ribbons 11 (plurality of optical fibers 111) is reversed at the two contact points (e.g. contact points J31 and J33).

In the case of FIG. 12, the bundling member 12G is wound clockwise on the outer circumference of the bundle of intermittently connected fiber ribbons 11. On the other hand, the bundling member 12H is wound counterclockwise on the outer circumference of the bundle of intermittently connected fiber ribbons 11. After the bundling members are joined at contact point J31, the bundling member 12G's winding direction, as well as the bundling member 12H's winding direction, is reversed. The bundling member 12G is wound counterclockwise on the outer circumference of the bundle of intermittently connected fiber ribbons 11, and is joined with the bundling member 12J at contact point J32 which is the contact point with the bundling member 12J; then, its winding direction is again reversed. On the other hand, the bundling member 12H's winding direction is reversed at contact point J31, and is wound clockwise on the outer circumference of the bundle of intermittently connected fiber ribbons 11, and is joined with the bundling member I at contact point J33 which is the contact point with the bundling member I; then, its winding direction is again reversed. Similarly, the bundling member 12I and the bundling member 12J are joined at contact point J34, and then, their winding directions are reversed. By repeating this operation, the state as illustrated in FIG. 11 is achieved.

The optical fiber unit 10 according to the first embodiment also has excellent workability in mid-span branching and in cable-end operation. For example, in cases where the bundling members 12 need to be peeled off from the bundle of intermittently connected fiber ribbons 11 at the time of mid-span branching, each bundling member can be peeled off easily by pulling one of the bundling members 12G to 12J outward in the radial direction of the optical fiber unit 10 in FIG. 12. Also in the present embodiment, because the range over which each bundling member is wound with respect to the bundle of intermittently connected fiber ribbons 11 is less than one round, there is no need to e.g. retrieve the bundling members helically, and the bundling member can be peeled off easily simply by being pulled in a predetermined direction. Further, in the present embodiment, any desired bundling member among the four bundling members 12G to 12J can be peeled off selectively. Thus, work can be conducted in a state where the other bundling members in locations that do not require peeling are left as-is; also, the bundle of intermittently connected fiber ribbons 11 are less likely to fall apart, and work can be conducted even more efficiently.

Advantages of Employing Three or More Bundling Members 12:

Employing three or more bundling members 12, as in the first embodiment, not only improves the workability at the time of extracting optical fibers 111, but also offers the advantage that an increase in transmission loss can be suppressed/prevented even when tension is applied to the bundling members 12. Hereinbelow, comparative examples using one or two bundling members 12 will be described first, and then, the advantages of employing three or more bundling members 12 will be described.

Figure 13A:
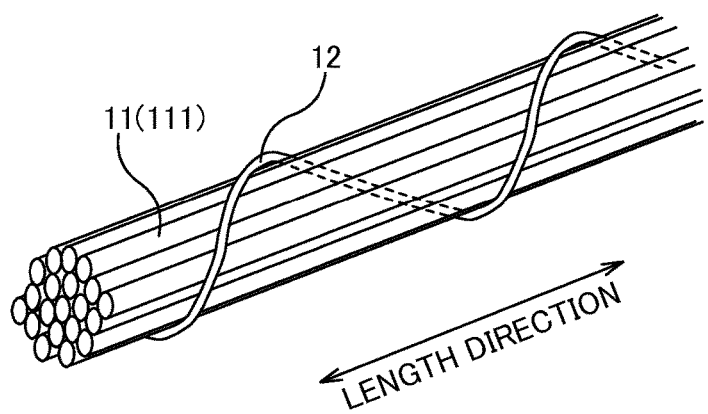
FIGS. 13A to 13C are explanatory diagrams illustrating a comparative example wherein a single bundling member 12 is wound helically around the circumference of a bundle of intermittently connected fiber ribbons 11.
Figure 13B:
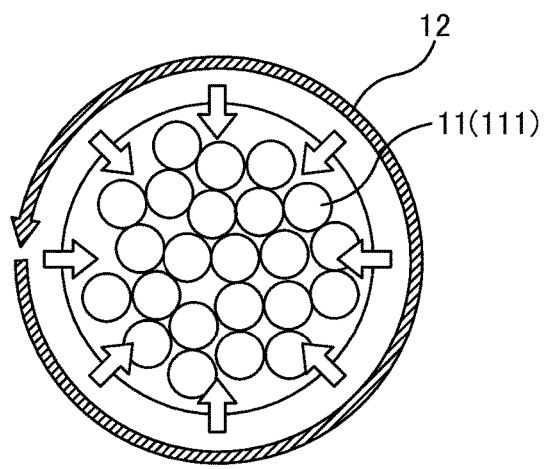
Figure 13C:
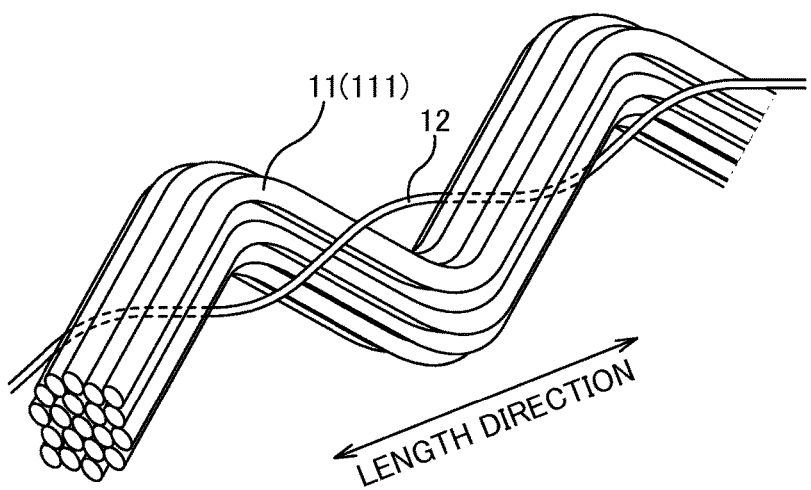

FIGS. 13A to 13C are explanatory diagrams illustrating a comparative example wherein a single bundling member 12 is wound helically around the circumference of a bundle of intermittently connected fiber ribbons 11. FIG. 13A is an explanatory diagram illustrating a state in which a tensile force in the length direction is applied to the single, helically wound bundling member 12. FIG. 13B is an explanatory diagram illustrating the force applied from the bundling member 12 to the optical fibers 111. FIG. 13C is an explanatory diagram illustrating how the optical fibers meander.

In cases where a tensile force in the length direction is applied to the bundling member 12 (cf. FIG. 13A), the bundling member 12 attempts to deform so that it passes along the shortest distance, and the bundling member 12 attempts to deform so as to come close to a straight line. Stated differently, when viewing a cross section from the length direction as illustrated in FIG. 13B, the bundling member 12—which depicts a circular path—attempts to deform toward the center of the circular path (or toward the barycentric position of the bundling member 12 when viewing a cross section from the length direction). Thus, when viewing a cross section from the length direction as illustrated in FIG. 13B, the optical fibers 111 receive, from the bundling member 12, a force toward the center of the bundling member 12's circular path. As a result, the optical fibers 111 meander along the length direction as illustrated in FIG. 13C, thus giving rise to an increase in transmission loss of optical signals. Particularly in cases where the optical fiber cable shrinks in the length direction due to temperature changes as described further below, there is a particularly noticeable increase in transmission loss.

Figure 14A:
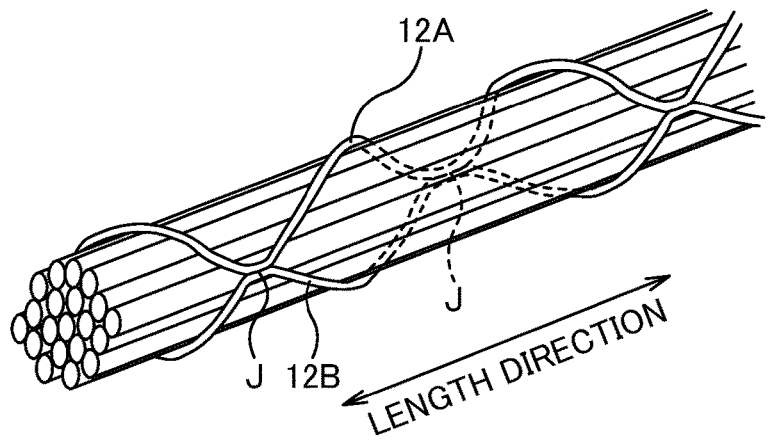
FIGS. 14A to 14C are explanatory diagrams illustrating a comparative example wherein two bundling members 12 are wound in an S-Z configuration on the circumference of a bundle of intermittently connected fiber ribbons 11, as in the first reference example.
Figure 14B:
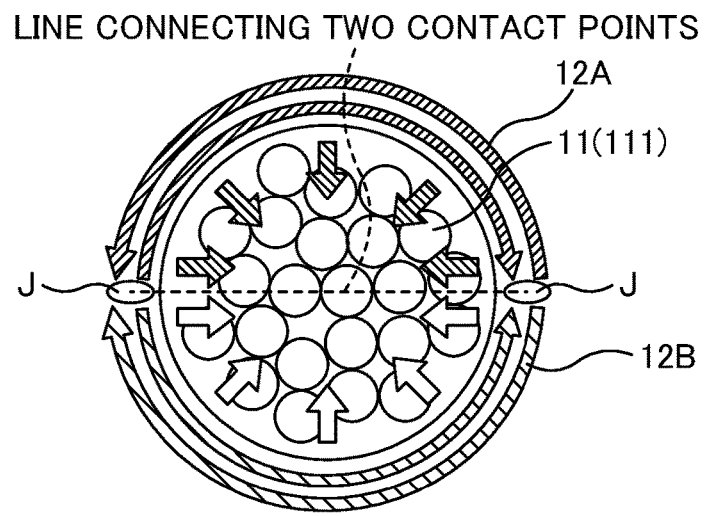
Figure 14C:
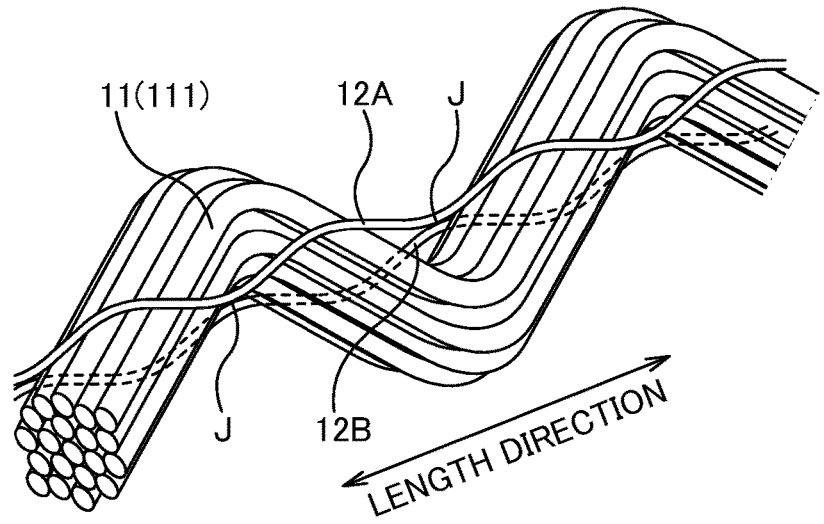

FIGS. 14A to 14C are explanatory diagrams illustrating a comparative example wherein two bundling members 12 are wound in an S-Z configuration on the circumference of a bundle of intermittently connected fiber ribbons 11, as in the first reference example. FIG. 14A is an explanatory diagram illustrating a state in which a tensile force in the length direction is applied to the two bundling members 12. FIG. 14B is an explanatory diagram illustrating the force applied from the bundling members 12 to the optical fibers 111. FIG. 14C is an explanatory diagram illustrating how the optical fibers meander.

Also in cases where a tensile force in the length direction is applied to the two bundling members 12 (FIG. 14A), each bundling member 12 attempts to deform so that it passes along the shortest distance, and each bundling member 12 attempts to deform so as to come close to a straight line. The winding direction of each bundling member 12 is reversed at the contact point J with the other bundling member 12; thus, when viewing a cross section from the length direction as illustrated in FIG. 14B, each bundling member 12 attempts to deform toward the inner side of a region surrounded by the semicircular path and the line connecting the two contact points J, and thus attempts to deform toward the line connecting the two contact points J. Thus, when viewing a cross section from the length direction as illustrated in FIG. 14B, the optical fibers 111 receive, from each bundling member 12 depicting a semicircular path, a force toward the line connecting the two contact points J.

In cases where there are two bundling members 12 as in the first reference example, when viewing a cross section from the length direction as illustrated in FIG. 14B, the line connecting the two contact points J of one bundling member 12 matches the line connecting the two contact points J of the other bundling member 12. Thus, in cases where a tensile force is applied to the two bundling members 12, the two bundling members 12 attempt to deform toward the same line when viewing a cross section from the length direction as illustrated in FIG. 14B. Further, when viewing a cross section from the length direction as illustrated in FIG. 14B, the bundling members 12 attempt to deform such that one contact point J moves toward the other contact point J. As a result, the optical fibers 111 meander along the length direction as illustrated in FIG. 14C, thus giving rise to an increase in transmission loss of optical signals. Particularly in cases where the optical fiber cable shrinks in the length direction due to temperature changes as described further below, there is a particularly noticeable increase in transmission loss.

Further, in cases where there are two bundling members 12 as in the first reference example, as viewed from a certain contact point J of the bundling members 12, no contact point J is present on the opposite side of the bundle of intermittently connected fiber ribbons 11 as illustrated in FIG. 14A (that is, the contact point on the opposite side is located at a different position in the length direction). Thus, when one contact point J moves toward the center of the bundle of intermittently connected fiber ribbons 11, the optical fibers 111 will meander along the length direction.

Figure 15:
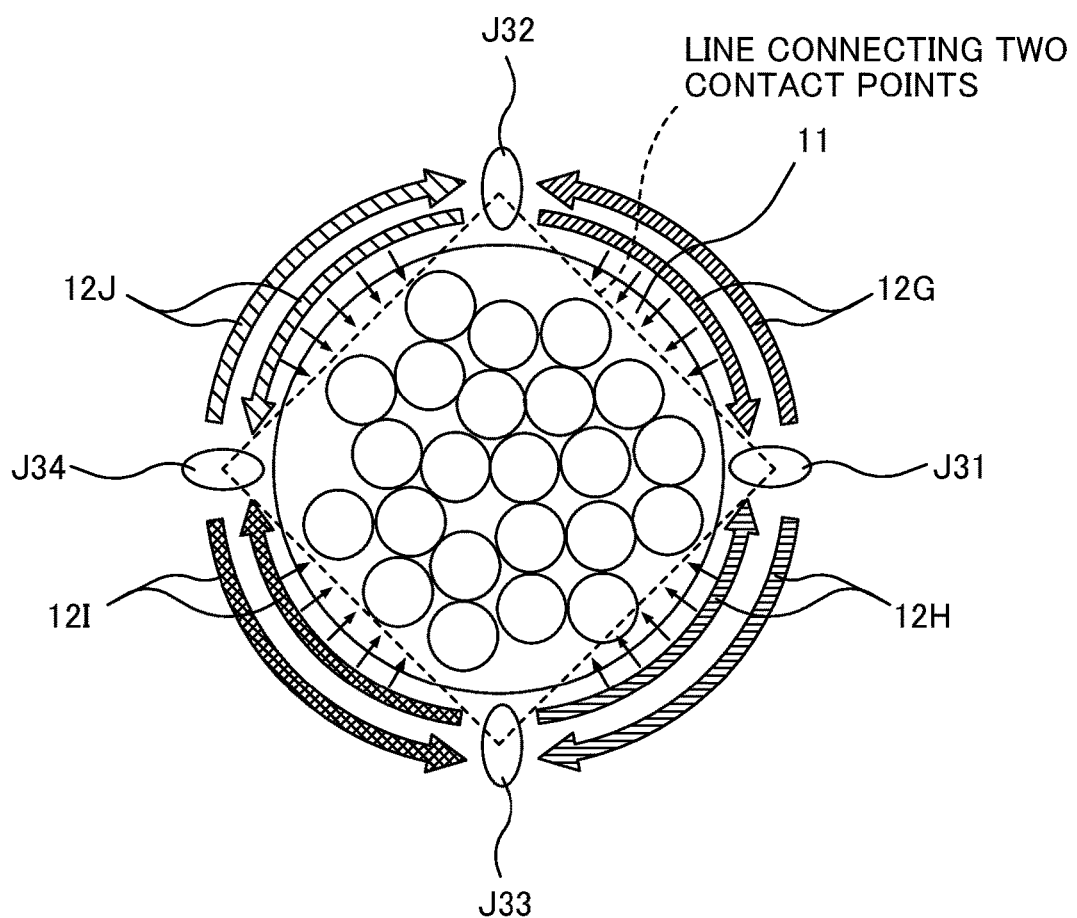
FIG. 15 is an explanatory diagram illustrating a case where a tensile force is applied to the bundling members 12 in the first embodiment.

FIG. 15 is an explanatory diagram illustrating a case where a tensile force is applied to the bundling members 12 in the first embodiment.

Also in cases where a tensile force in the length direction is applied to the bundling members 12 of the first embodiment, each bundling member 12 attempts to deform so that it passes along the shortest distance, and each bundling member 12 attempts to deform so as to come close to a straight line. The winding direction of each bundling member 12 is reversed at each contact point J; thus, when viewing a cross section from the length direction as illustrated in FIG. 15, each bundling member 12 attempts to deform toward the inner side of a region surrounded by the arc-shaped path and the line connecting the two contact points J, and thus attempts to deform toward the line connecting the two contact points J. Thus, when viewing a cross section from the length direction as illustrated in FIG. 15, the optical fibers 111 receive, from each bundling member 12 depicting an arc-shaped path, a force toward each line (the dotted line in the figure) connecting two contact points J.

In cases where there are three or more bundling members 12 as in the first embodiment, a certain bundling member 12 (e.g. bundling member 12G) can be arranged such that its winding direction with respect to the bundle of optical fibers 111 is reversed at a contact point with an adjacent bundling member (e.g. bundling member 12H) and at a contact point with another adjacent bundling member (e.g. bundling member 12J). By arranging the bundling members 12 in this way, when viewing a cross section from the length direction as illustrated in FIG. 15, the line connecting the two contact points J of a certain bundling member 12 does not match the line connecting the two contact points J of another bundling member 12, but a polygon (a square in this example) is formed by the lines that each connect the two contact points J of each of the bundling members 12. Thus, when each bundling member 12 attempts to deform toward the inner side of a region surrounded by the arc-shaped path and the line connecting the two contact points J, each bundling member 12 is in a state where it is less likely to deform to the inside of this polygon. Further, when viewing a cross section from the length direction as illustrated in FIG. 15, even when a certain bundling member 12 attempts to deform such that one contact point J, among the two contact points J of that bundling member 12, moves toward the other contact point J, the bundling member 12 is in a state where it is less likely to deform into the space inside this polygon.

It should be noted that, in cases where a polygon (a square in this example) is formed by the lines that each connect the two contact points J of each of the bundling members 12, it is preferable that the range over which each bundling member 12 is wound with respect to the bundle of optical fibers 111 is less than or equal to half the outer circumference of the bundle of optical fibers 111. Stated differently, it is preferable that the maximum angle of the path of each bundling member 12 as viewed from the length direction is less than or equal to 180 degrees. In this way, the center of the bundle of optical fibers 111 is located on the inner side of the region surrounded by the polygon, and the cross-sectional area of the region surrounded by the polygon is increased; thus, the deformation of the optical fibers 111 can be further suppressed.

Accordingly, in cases where there are three or more bundling members 12 as in the first embodiment, even if tension is applied to the bundling members 12, the optical fibers 111 are less likely to deform so as to bend to the inside of the polygon illustrated in FIG. 15 (i.e., the polygon formed by the lines that each connect the two contact points J of each of the bundling members 12 when viewing a cross section from the length direction as illustrated in FIG. 15). Thus, in the first embodiment, the optical fibers 111 are less likely to meander. As a result, it is possible to suppress/prevent an increase in transmission loss. Further, even in cases where the optical fiber cable shrinks in the length direction due to temperature changes, an increase in transmission loss can be suppressed/prevented, as described below.

Further, in cases where there are four bundling members 12 as in the first embodiment, as viewed from a certain contact point J, another contact point J is present on the opposite side of the bundle of intermittently connected fiber ribbons 11, as illustrated in FIG. 11. Thus, when one contact point J attempts to move toward the center of the bundle of intermittently connected fiber ribbons 11, another contact point J located on the opposite side of the bundle of intermittently connected fiber ribbons 11 from the aforementioned contact point J also attempts to move toward the center of the bundle of intermittently connected fiber ribbons 11. As a result, force applied to the optical fibers 111 is canceled out, and the optical fibers 111 can be suppressed/prevented from meandering. It should be noted that, in cases where there are four bundling members 12, if the bundling members 12 are arranged evenly along the length direction of the bundle of optical fibers 111 such that each bundling member 12 depicts an arc covering one-fourth of the circumference of the bundle as illustrated in FIG. 11, there will be another contact point J present on the opposite side of the bundle of optical fibers 111 as viewed from a certain contact point J of one of the bundling members 12, and thus, the optical fibers 111 can be suppressed/prevented from meandering.

FIG. 15 illustrates an example where there are four bundling members 12, but it will suffice to provide at least three bundling members 12. In cases where there are at least three bundling members 12, a polygon (e.g. a triangle) can be formed by the lines that each connect the two contact points J of each of the bundling members 12 when viewing a cross section from the length direction. As a result, the optical fibers 111 are less likely to meander, and thus, it is possible to suppress/prevent an increase in transmission loss.

Next, transmission loss was studied by producing optical fiber cables having the structure illustrated in FIG. 1.

As examples of optical fiber cables having helically wound bundling members 12, a single-wind optical fiber cable with one bundling member 12 wound helically in one direction (cf. FIG. 13A), and a cross-wound optical fiber cable with two bundling members 12 wound helically in opposite directions from one another (cf. FIG. 6) were prepared. It should be noted that, in these optical fiber cables, the angle of each bundling member 12's path was 360 degrees when viewing a cross section from the length direction.

As optical fiber cables having two bundling members 12 wound in an S-Z configuration, three types of optical fiber cables—in each of which the angle of the bundling member 12's path was different when viewing a cross section from the length direction—were prepared. In each of the cables, the maximum angle of the bundling member 12's path when viewing a cross section from the length direction was 270 degrees, 225 degrees, or 180 degrees. (In each case, the angle of the other bundling member 12's path was 90 degrees, 135 degrees, or 180 degrees.)

As optical fiber cables having three bundling members 12 wound in an S-Z configuration, three types of optical fiber cables—in each of which the angle of the bundling member 12's path was different when viewing a cross section from the length direction—were prepared. In each of the cables, the maximum angle of the bundling member 12's path when viewing a cross section from the length direction was 240 degrees, 180 degrees, or 120 degrees. Similarly, as optical fiber cables having four bundling members 12 wound in an S-Z configuration, three types of optical fiber cables—in each of which the angle of the bundling member 12's path was different when viewing a cross section from the length direction—were prepared. In each of the cables, the maximum angle of the bundling member 12's path when viewing a cross section from the length direction was 180 degrees, 120 degrees, or 90 degrees.

The density of the optical fibers 111 in each optical fiber cable was 10 fibers/mm$^2$ in each optical fiber cable. The winding pitch of the bundling members 12 was 100 mm in each optical fiber cable.

Transmission loss was measured according to Temperature Cycling per IEC 60794-1-2 at an initial value of +20° C. and low and high temperatures of −30° C. and +70° C. The measurement results are shown in FIG. 16. It should be noted that the transmission loss at low temperature or high temperature as shown in the table is the transmission loss of a selected one of the optical fibers in a cycle, among the three cycles conducted, with the greatest transmission loss.

As regards the evaluation results shown in the table, samples in which the amount of increase in loss with respect to the initial state was 0.07 dB or greater were rated as POOR, and samples in which the amount of increase in loss was less than 0.07 dB were rated as GOOD. From the evaluation results shown in the table, it can be verified that excellent results are obtained by optical fiber cables in which three or more bundling members 12 are wound in an S-Z configuration.

{Other Embodiments}

The foregoing embodiments are for facilitating the understanding of the present invention, and are not to be construed as limiting the present invention. The present invention may be modified and/or improved without departing from the gist thereof, and it goes without saying that the present invention encompasses any equivalents thereof.

Intermittently Connected Fiber Ribbon:

The foregoing embodiment describes an example in which the intermittently connected fiber ribbon 11 is formed by connecting four optical fibers 111. However, the number of optical fibers constituting the intermittently connected fiber ribbon 11 is not limited thereto; the number of optical fibers may be increased or decreased. Also, the connecting positions and the number of the aforementioned connection parts 115 for connecting two adjacent optical fibers 111 may be changed depending on the use of the intermittently connected fiber ribbon 11.

Number of Bundling Members:

The foregoing embodiment describes an example in which there are four bundling members wound on the bundle of optical fibers. However, the number of bundling members to be provided in a single optical fiber unit is not limited thereto. For example, there may be three, or five or more, bundling members. However, considering the amount of water-absorbing substances supplied by the bundling members and the workability during mid-span branching of the optical fiber cable as described above, it is preferable to provide a plurality of bundling members per single optical fiber unit and allow each bundling member to be peeled off easily.

REFERENCE SIGNS LIST

1: Optical fiber cable;
10: Optical fiber unit;
10A, 10B, 10C: Optical fiber units;
11: Intermittently connected fiber ribbon;
111: Optical fiber;
115: Connection part;
12: Bundling member;
12A to 12J: Bundling members;
15: Wrapping;
20: Slotted core;
21: Slot;
22: Rib;
25: Slot wrapping;
30: Sheath;
40: Tension member.

The invention claimed is:

1. An optical fiber unit comprising:
a plurality of optical fibers; and
at least three bundling members that bundle the plurality of optical fibers into a bundle, wherein:
a first bundling member, among the at least three bundling members, is arranged along a length direction of the bundle of the optical fibers so as to be wound on an outer circumference of the bundle of the optical fibers;
the first bundling member is joined with a second bundling member at a contact point where the first bundling member contacts the second bundling member, and is joined with a third bundling member at a contact point where the first bundling member contacts the third bundling member, the third bundling member being different from the second bundling member;
the first bundling member's winding direction with respect to the bundle of the optical fibers is reversed at the contact point with the second bundling member and at the contact point with the third bundling member; and
the plurality of optical fibers are bundled by the at least three bundling members including the first bundling member, the second bundling member, and the third bundling member.

2. The optical fiber unit according to claim 1, wherein the plurality of optical fibers are bundled by four bundling members.

3. The optical fiber unit according to claim 2, wherein the bundling members are arranged evenly along the length direction of the bundle of the optical fibers such that each bundling member depicts an arc covering one-fourth of the circumference of the bundle.

4. The optical fiber unit according to claim 2, wherein, as viewed from one of the contact points, another one of the contact points is present on the opposite side of the bundle.

5. The optical fiber unit according to claim 1, wherein, when a cross section of the optical fiber unit is viewed from the length direction of the bundle of the optical fibers, a polygon is formed by lines that each connect the two contact points of each of the bundling members.

6. The optical fiber unit according to claim 5, wherein the range over which each bundling member is wound with respect to the bundle of the optical fibers is less than or equal to half the outer circumference of the bundle of the optical fibers.

7. The optical fiber unit according to claim 1, wherein:
an optical fiber ribbon is formed by a plurality of the optical fibers that are arranged side by side; and
connection parts that each connect two adjacent ones of these optical fibers are arranged intermittently in a length direction and a width direction of the optical fiber ribbon.

8. An optical fiber branching method comprising:
(1) in an optical fiber unit including a plurality of optical fibers, and at least three bundling members that bundle the plurality of optical fibers into a bundle, wherein:
a first bundling member, among the at least three bundling members, is arranged along a length direction of the bundle of the optical fibers so as to be wound on an outer circumference of the bundle of the optical fibers;
the first bundling member is joined with a second bundling member at a contact point where the first bundling member contacts the second bundling member, and is joined with a third bundling member at a contact point where the first bundling member contacts the third bundling member, the third bundling member being different from the second bundling member;
the first bundling member's winding direction with respect to the bundle of the optical fibers is reversed at the contact point with the second bundling member and at the contact point with the third bundling member; and
the plurality of optical fibers are bundled by the at least three bundling members including the first bundling member, the second bundling member, and the third bundling member,
peeling apart at least one of the contact points of the first bundling member of the optical fiber unit; and
(2) extracting a predetermined optical fiber from the bundle of the optical fibers.

9. An optical fiber cable comprising a plurality of optical fiber units housed inside the optical fiber cable, each of the optical fiber units including a plurality of optical fibers, and at least three bundling members that bundle the plurality of optical fibers into a bundle, wherein:
a first bundling member, among the at least three bundling members, is arranged along a length direction of the bundle of the optical fibers so as to be wound on an outer circumference of the bundle of the optical fibers;
the first bundling member is joined with a second bundling member at a contact point where the first bundling member contacts the second bundling member, and is joined with a third bundling member at a contact point where the first bundling member contacts the third bundling member, the third bundling member being different from the second bundling member;
the first bundling member's winding direction with respect to the bundle of the optical fibers is reversed at the contact point with the second bundling member and at the contact point with the third bundling member; and
the plurality of optical fibers are bundled by the at least three bundling members including the first bundling member, the second bundling member, and the third bundling member.

10. An optical fiber unit comprising:
a plurality of optical fibers; and
a plurality of bundling members that bundle the plurality of optical fibers into a bundle, wherein:
a first bundling member, among the plurality of bundling members, is arranged along a length direction of the bundle of the optical fibers so as to be wound on an outer circumference of the bundle of the optical fibers;
the first bundling member comprises a plurality of core parts and a cover part that covers the outer circumference of each of the core parts, the cover part having a lower melting point than the melting point of the core parts;
the first bundling member is thermally fusion-bonded with a second bundling member at a contact point where the first bundling member contacts the second bundling member;
the first bundling member's winding direction with respect to the bundle of the optical fibers is reversed at the contact point; and
the plurality of optical fibers are bundled by the plurality of bundling members including the first bundling member and the second bundling member.

11. A method for producing an optical fiber unit, the method comprising:
preparing a plurality of optical fibers and a plurality of bundling members that bundle the plurality of optical fibers into a bundle, the plurality of bundling members including a first bundling member and a second bundling member, the first bundling member comprising a plurality of core parts and a cover part that covers the outer circumference of each of the core parts, the cover part having a lower melting point than the melting point of the core parts; and
bundling the plurality of optical fibers by the plurality of bundling members, wherein
the first bundling member is thermally fusion-bonded with the second bundling member at a contact point where the first bundling member contacts the second bundling member by heating the cover part at a temperature equal to or higher than the melting point of the cover part,
so that the first bundling member, among the plurality of bundling members, is arranged along a length direction of the bundle of the optical fibers so as to be wound on an outer circumference of the bundle of the optical fibers;
and that the first bundling member's winding direction with respect to the bundle of the optical fibers is reversed at the contact point.

* * * * *